(12) United States Patent
Sheets et al.

(10) Patent No.: US 9,070,129 B2
(45) Date of Patent: Jun. 30, 2015

(54) METHOD AND SYSTEM FOR SECURING DATA FIELDS

(75) Inventors: John Foxe Sheets, San Francisco, CA (US); Kim Wagner, Sunnyvale, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 917 days.

(21) Appl. No.: 12/202,978

(22) Filed: Sep. 2, 2008

(65) Prior Publication Data

US 2009/0063354 A1 Mar. 5, 2009

Related U.S. Application Data

(60) Provisional application No. 60/969,805, filed on Sep. 4, 2007.

(51) Int. Cl.
*G06Q 20/40* (2012.01)
*G06Q 20/04* (2012.01)

(52) U.S. Cl.
CPC .............. *G06Q 20/403* (2013.01); *G06Q 20/04* (2013.01); *G06Q 20/401* (2013.01)

(58) Field of Classification Search
CPC ....................................................... G06Q 40/00
USPC ....................................................... 705/50–67
See application file for complete search history.

(56) References Cited

U.S. PATENT DOCUMENTS

| | | | | |
|---|---|---|---|---|
| 5,477,038 A | * | 12/1995 | Levine et al. ................. | 235/380 |
| 5,500,513 A | * | 3/1996 | Langhans et al. ............. | 235/380 |
| 6,163,771 A | | 12/2000 | Walker et al. | |
| 6,181,814 B1 | | 1/2001 | Carney | |
| 6,266,413 B1 | * | 7/2001 | Shefi .............................. | 705/71 |
| 6,470,085 B1 | * | 10/2002 | Uranaka et al. ............... | 380/231 |
| 6,934,844 B2 | * | 8/2005 | Phillips et al. ................. | 705/67 |
| 2004/0039686 A1 | | 2/2004 | Klebanoff | |
| 2007/0055630 A1 | | 3/2007 | Gauthier et al. | |

FOREIGN PATENT DOCUMENTS

WO WO9311619 6/1993

OTHER PUBLICATIONS

Walker (One-Time Pad Generator, www.fourmilab.ch/onetime/otpjs.html, May 27, 1997).*
Electronic Transactions Association (CVV number at www.CVVnumber.com (copyright 1999)).*

(Continued)

*Primary Examiner* — Calvin L Hewitt, II
*Assistant Examiner* — Cristina Sherr
(74) *Attorney, Agent, or Firm* — Kilpatrick Townsend & Stockton LLP

(57) ABSTRACT

A merchant conducting a transaction on an account forms transaction data with a sensitive data field. To obscure the account prior to transmitting information about the transaction, for each character in the sensitive data field, a combined character is formed with a character of a generated pad. A replacement character is formed by a modulus operation on the combined character and is stored in the corresponding position in the sensitive data field. A transmission containing the sensitive data field with replacement characters is delivered to the merchant's acquirer.

21 Claims, 4 Drawing Sheets

(56) References Cited

OTHER PUBLICATIONS

Weinstein, Eric W., CRC Concise Encyclopedia of Mathematics, Chapman & Hall/CRC, 1998, pp. 1582-1583.

National Institute for Standings and Technology, FIPS Pub 74, Federal Information Processing Standards Publication 1981 Guidelines for Implementing and Using the NBS Data Encryption Standard, Apr. 1, 1981, 34 pages, http://www.itl.nist.gov/fipspubs/fip74.htm.

* cited by examiner

METHOD AND SYSTEM FOR SECURING DATA FIELDS

RELATED APPLICATIONS

The application claims priority to U.S. Provisional Application Ser. No. 60/969,805, filed on Sep. 4, 2007, titled "Method and System For Securing Data Field," which is incorporated herein by reference.

BACKGROUND

The present invention relates to a payment processing system for a plurality of transactions each characterized by a merchant and an account holder engaging in the transaction upon an account that an issuer issues to the account holder, wherein a transaction handler processes the transaction for both the merchant and processes other transactions for other merchants, each merchant submitting the corresponding transaction to its acquirer for processing by the transaction handler who requests the issuer of the corresponding account to obtain payment for the corresponding transaction from the corresponding account and for which the issuer forwards the payment to the transaction handler who forwards the payment to the acquirer to pay the merchant for the corresponding said transaction. The present invention more particularly relates to the detection of fraud in a transaction upon such an account in such a payment processing system by the use of encryption of the account.

BACKGROUND

A merchant conducting a transaction with an account holder on an account issued by an issuer is common place largely due to its convenience to the merchant and the account holder, the low transactional overhead cost of using such a payment system of acquired transactions, and the speed with which the transaction can be completed. With these advantages over a transaction for which a consumer's payment to a merchant is made by cash or check, transactions fraudulently obtained accounts are a major and rising concern. It would be an advance in the art to use an encrypted account to detect an attempt by a party to conduct a transaction on the account where the account was fraudulently obtained, and where the detection occurs prior to the completion of the transaction. It would be a further advantage to detect the source from which the account was fraudulently obtained.

SUMMARY

In one implementation, an account is retrieved at a Point of Service terminal (POS) of a merchant attempting to conduct a transaction with an account holder associated with the account. The transaction data pertaining to the transaction data includes a sensitive data field having one or more characters of a predetermined character set. For each character in the sensitive data field there is formed a combined character from the character of the sensitive data field and a character of a generated pad. A replacement character is formed by performing a modulus operation on the combined character. The replacement character is then stored in position of the corresponding character in the sensitive data field. A transmission is then formed for delivery to the merchant's acquirer. The transmission contains the transaction data with the sensitive data field.

In another implementation, a first transmission is received from a merchant. The first transmission has transaction data from a transaction upon an account of an account holder. The transaction data includes a sensitive data field having characters of a predetermined character set. By use of the sensitive data field, an attempt is made to retrieve a transaction data record from a transaction database. The transaction data record contains a data set from a previous transaction that includes the account upon which the previous transaction was conducted. The sensitive data field, which is encrypted as the corresponding account upon which the previous transaction was conducted, is encrypted by a character-by-character modulo operation using a generated pad. If there is a retrieval of the transaction data record, a second transmission is formed and sent that contains a fraud notification for the transaction. If, however, there is not a retrieval of the transaction data record, a third transmission containing a no-fraud notification for the one said transaction is formed and sent.

BRIEF DESCRIPTION OF DRAWINGS

Implementations of the invention will become more apparent from the detailed description set forth below when taken in conjunction with the drawings, in which like elements bear like reference numerals.

DESCRIPTION

Figure 1:
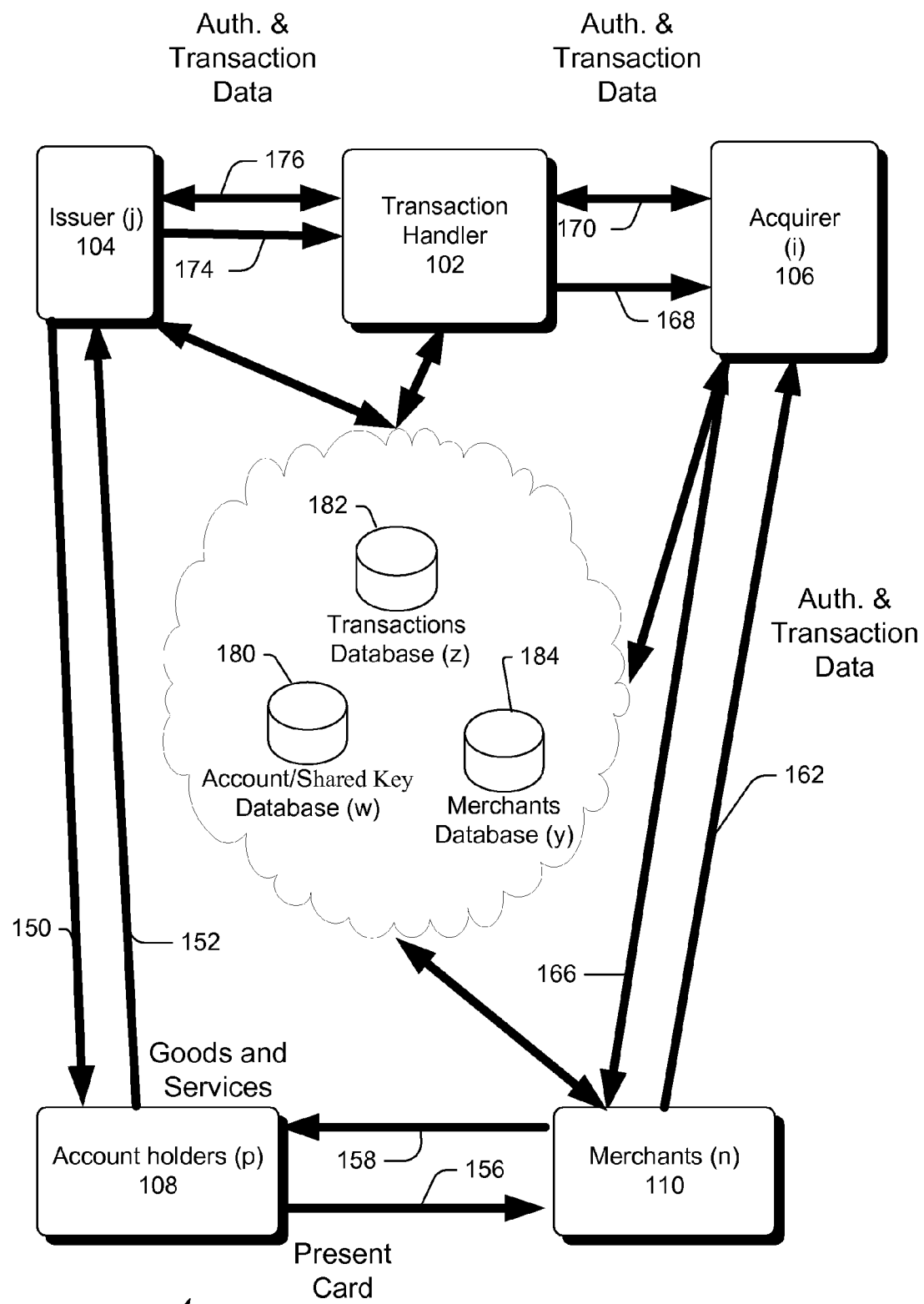
FIG. 1 depicts an exemplary process for the provision of the financial service of authorizing and remunerating electronic payment device transactions (i.e.; credit card transactions)

FIG. 1 is a diagram depicting an exemplary process 100 of a particular financial transaction system. By way of explanation for the nomenclature of reference numerals used in the Figures and described in the specification, a lower case letter in parenthesis is intended to mean an integer variable having a value from 1 to the capital case of the lower case letter, which value can be large (i.e., approaching infinity). Thus '(b)' is intended to mean that the integer 'b' can have a value from 1 to B, and '(c)' is intended to mean that the integer 'c' can have a value from 1 to C, etc. As such, drawing elements 104, 106, 108, 110, 180, 182, and 184 in FIG. 1 are illustrated with a block, but indicate one or more elements can be present. For example, Issuer (j) 104 is one of a possible plurality of issuers, where j may range from 1 to a large integer.

Account holder (p) 108 presents an electronic payment device (i.e.; a credit card) to a Merchant (n) 110 (at step 156) as tender for a financial transaction such as a purchase of goods. Those of skill in the art will recognize that other financial transactions and instruments other than credit cards may also be used, including, but not limited to, a prepaid card and a debit card. For purposes of illustration and explanation, however, reference will be made to a credit card.

As part of the transaction, the Account holder's 108 credit card is typically scanned or swiped through a magnetic card reader by the merchant (n) 110, whereupon account information is read from the card and a request for authorization is transmitted to the Merchant's 110 Acquirer (i) 106 (at step 162). Each Acquirer (i) 106 is a financial organization that processes credit card transactions for businesses, for example merchants, and is licensed as a member of a transaction handler (TH) 102 such as a credit card association. As such, each Acquirer (i) 106 establishes a financial relationship with one or more Merchants (n) 110, and assists in preventing and reporting fraudulent transactions and security-related events.

The Acquirer (i) 106 transmits the account information to the TH 102 (at step 170), who in turn routes the request to the account holder's issuing bank, or Issuer (j) 104 (at step 176). The Issuer (j) 104 returns authorization information to the TH 102 (at step 174) who returns the information to the Merchant (n) 110 through the Acquirer (i) 106 (by steps 168 and 166). The Merchant (n) 110 now knowing whether the Issuer's (j) 104 credit card account is valid and supports a sufficient credit balance, may complete the transaction and the Account holder (p) 108 in turn receives goods and/or services in exchange (at step 158). Most credit card associations instruct merchants that, after receiving authorization, the detailed credit card account information obtained from the point of sale magnetic stripe scanner must be deleted.

To reconcile the financial transactions and provide for remuneration, information about the transaction is provided by the Merchant (n) 110 to Acquirer (i) 106 (at step 162), who in turn routes the transaction data to the TH 102 (at step 170) who then provides the transaction data to the appropriate Issuer (j) 104 (at step 176). The Issuer (j) 104 then provides funding for the transaction to the TH 102 (at step 174) through a settlement bank (not shown). The funds are then forwarded to the Merchant's (n) 110 Acquirer (i) 106 (at step 168) who in turn pays the Merchant (n) 110 for the transaction conducted at step 162 less a merchant discount, if applicable. The Issuer (j) 104, then bills the Account holder (p) 108 (at step 150), and the Account holder (p) 108 pays the Issuer 104 (at step 152), with possible interest or fees.

Each of the Issuer (j) 104, Merchants (n) 110, Acquirer (i) 106 and the TH 102 may have access to information resources having one or more of the following databases: transaction database (z) 182, merchant database (y) 184, or account database (w) 180. These databases can be connected by a network, internet, virtual private network, or by other means known to those skilled in the art. Moreover, not every participant must necessarily have access to any or all of the databases. Each database can assign read, write, and query permissions as appropriate to the various participants. For example, a Merchant (n) 110 have read access to the account database (w) 180 and the Issuer (j) may have read and write access.

The transaction database (z) 182 is designed to store some or all of the transaction data originating at the Merchants (n) 110 that use a payment device for each transaction conducted between an Account holder (p) 108 and the Merchant (n) 110. The transaction data can include information associated with the account of an Account holder (p) 108, date, time, and location among other more specific information including the amount of the transaction. The database can be searched using account information, date and time (or within proximity thereof), or by any other field stored in the database.

The Merchant database (y) 184 is designed to store information about each Merchant (n) 110. The Merchant database (y) can contain information such as the unique identification of each Merchant (n) 110, an identifier for each point of sale device in use by the Merchant (n) 110, and location of the Merchant (n) 110.

The account database (w) 180 is designed to store account information for payment devices associated with Account holder (p). The account database (w) 180 can store part or all of an account number, unique encryption key, account information, account name. The information from the account database (w) 180 can be associated with information from the transaction database (z) 182.

An Account holder (p) 108 initiates a transaction with a Merchant (n) 110 by presenting a card at step 156 to the Merchant (n) 110. The card is typically presented at the point of sale (not shown) such as by swiping a card in a card reader or entering account details at a website. Certain transaction information is transmitted from the point of sale device in route to the Merchant's (n) 110 Acquirer (i) 106 and only some of the information may contain sensitive information. The transaction information can include account information, account name, transaction balance, transaction time, transaction date, and transaction location. Sensitive information includes information such account number and account holder name that identify and associate a particular account with a particular account holder. This transaction information may be transmitted via a less secure communication medium. In addition, a transmission of transaction data may occur with weak or no encryption between two or more points from the point of origin, such as the point of sale device at the Merchant (n) 110, and the ultimate destination, such as the Acquirer (i) 106. These points can include, without limitation, from the card reader to a point of sale device, point of sale device at the Merchant (n) 110 and a network router or computer that is connected to a network but is housed and maintained by the Merchant (n) 110 and between the Merchant (n) 110 and the Acquirer (i) 106. The communication channel could be Ethernet, wireless internet, satellite, infrared transmission, or other known communication protocols. Some or all of the transmission may also be stored for record keeping, archival or data mining purposes with little or no encryption. For example, the Merchant (n) 110 may store transaction data, including certain account information in the Merchant's (n) 110 accounts on file database for reuse later.

Furthermore, many point of sale system include a certain amount of transaction validation. Transaction validation is used to detect common errors, inconsistencies, and other transaction related problems before communicating with the Acquirer (i) 106. Such transaction validation can include confirming the payment type, routing information, certain aspects of the account number (like length and unique identifiers). These validation routines rely upon specific formatting criteria such as the fact that a valid account number is of a given length comprised of numbers zero through nine. Any deviation from these rules may cause the system to preemptively terminate a transaction and request the Account holder (p) 108 retry their payment device. In such situations, encrypting some or all of the transaction data using standard encryption techniques would cause the transaction validation tests to fail. For example, using standard encryption techniques on an account number will change the character type, may change the length, may alter required values (such as affecting numbers indicating card type or routing information).

In this process, transaction information is retrieved from a point of sale device at a Merchant (n) 106. The transaction information is comprised of account information together with other information about the transaction itself: time, date, location, value, etc. Certain of the transaction information is considered sensitive information including, without limitation, account number, credit card verification number, and account name. In at least one of the sensitive fields, the characters will be encrypted using modulus character addition.

In modulus character addition, each character of the applicable sensitive field is added to a character of a generated pad.

The generated pad is described in greater detail below, but specifies an offset by which the character value will be shifted. Since shifting the characters (positively or negatively) may cause certain characters to exceed the bounds of a given character set, a modulus operation is applied. As used in the process 100, the modulus operation will be performed using a value equal to the number of characters in the character set. For example, modulus 10 for numeric character set (0-9), modulus 26 for alphabetic (A-Z), modulus 35 for alphanumeric (A-Z and 0-9), and, when a number base is set, modulus 12 for base 12, modulus 16 for base 16, and modulus 64 for base 64.

Each character resulting for the character modulus addition is stored in the same character position as the original, unencrypted character. A transmission is then formed comprising the newly encrypted sensitive data field together with the other transaction data.

As stated above, the transmission is destined for the Acquirer (i) 406, the TH 402 and ultimately the Issuer (i) 404, and there may be various points along that path where the sensitive data fields are transmitted across unencrypted lines of communication, are stored without encryption or with only weak encryption, or are capable of being intercepted. In those situations, sensitive data fields encrypted using the character-by-character modulus addition will appear to be unencrypted and valid. Under nearly all circumstances, unauthorized use of the encrypted sensitive data fields in a subsequent transaction will result in the transaction failing since the encrypted sensitive data fields, while appearing to be valid, likely do not match any valid, active account.

In one implementation, the process can include a method of detecting fraud. In this implementation, a merchant (n) 110, an acquirer (i) 106 or a TH 102 can store the transaction data for each successful transaction in a transaction database. The transaction database will store at least enough information to reconstruct the encrypted account number. For example, and without limitation, the transaction database can contain a data record for the encrypted account number itself; can include transaction date, time and location if transaction date, time and location are used to generate the pad; or can include a data record for the generated pad itself for each transaction. When a transaction fails, the merchant (n) 110, the acquirer (i) 106 or the TH 102 can use the account number of the failed transaction to retrieve a list of any previous transactions that used the account number of the failed transaction as the encrypted account number. If one or more transaction records are retrieved from the transaction database then the failed transaction is marked suspicious. The merchant (n) 110, the acquirer (i) 106 or the TH 102 can then send a notification indicating that there is suspicious activity.

Further, where the transaction database can contain other transaction data, such as time, date, and place, the source of the fraud can be determined. The transaction database can be further queried with respect other transactions that occurred in spatial and temporal proximity to the suspicious activity. Transactions occurring using those accounts can be preemptively marked as suspicious to counter fraudulent activity before any actual attempted transaction.

Figure 2:
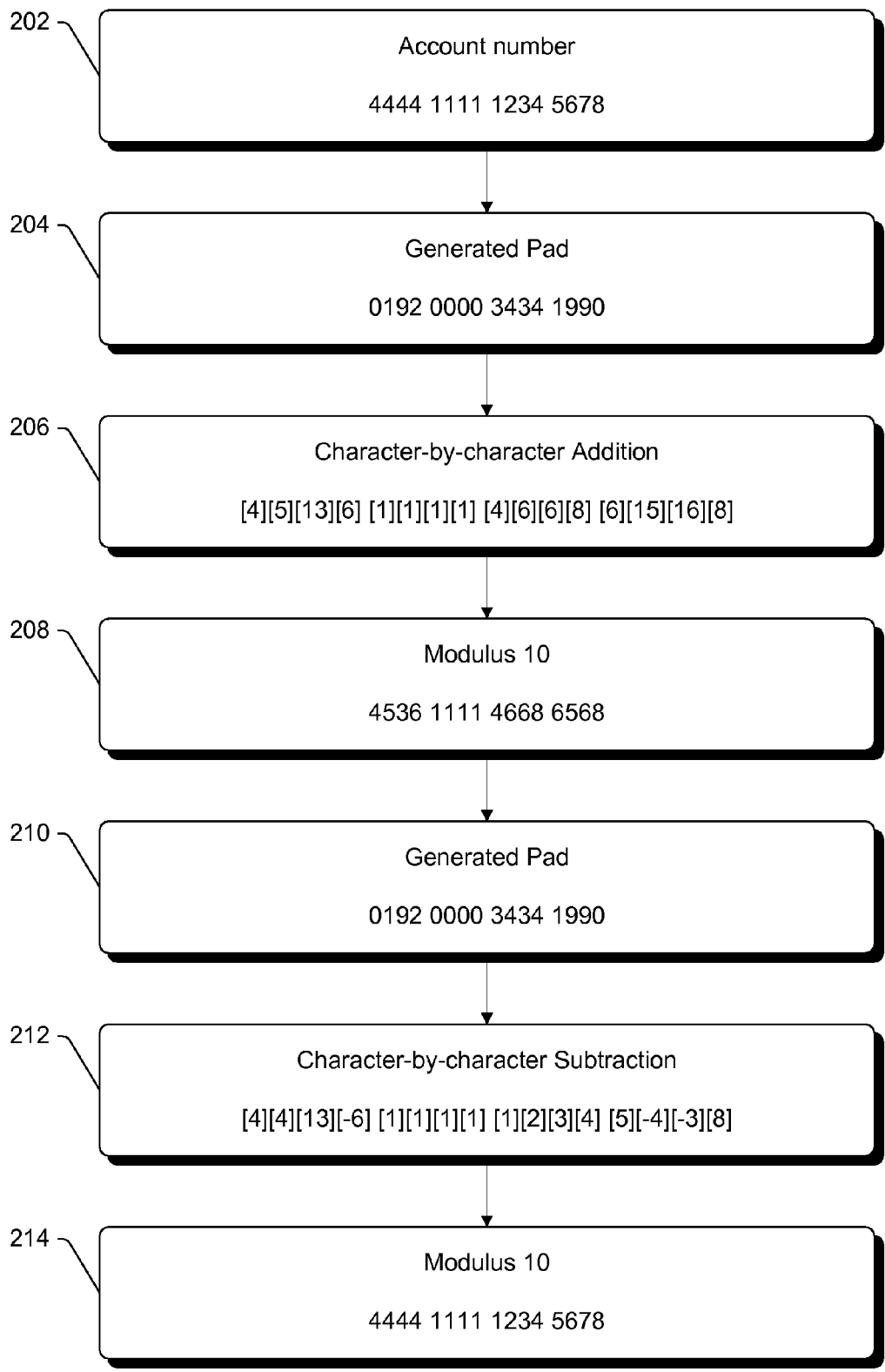
FIG. 2 depicts an exemplary set of steps for encryption of an account number using character-by-character modulus addition using only numeric characters.

FIG. 2 shows an exemplary method 200 wherein the steps transform an exemplary account number into an encrypted form suitable for transmission and then decrypting the encrypted account back into the original account number. Step 202 shows the unencrypted version of the account number. The account number consists of sixteen characters. The characters are selected from a character set comprised of numeric values zero through nine.

Steps 204 and 210 show the generation of a pad. A pad is an arbitrary set of characters that is used to encrypt and decrypt the account number. The pad, in general, will be used to indicate the corresponding shift in value of the original source character. A pad can be generated based on any number of techniques. For example, a pad can be generated based on an algorithm using a key shared by both the sender and receiver; be a fixed string known by both the encrypting and decrypting entities; be based on other transaction data such as time, date, location, price, number of items, account name, credit card verification code, or any combination of the preceding; a custom pin associated with an account; or a one time pad issued at the start of each transaction. By way of example only, a pad could be generated for a numeric character set by concatenating the time and date of a transaction such as 133301282008 could be used as a pad for a transaction occurring at 1:33 pm (1333) on Jan. 28, 2008 (01282008). Moreover, the pad generation algorithm can use any combination of techniques, for example applying a key known by both the encrypting and decrypting entity together with the date and time example above. In this situation, the key might be used to subtract 111101111001 from the date generated pad to produce a more obscure pad such as 022200171007.

In addition, other techniques including, but not limited to, Derived Unique Key Per Transaction (DUKPT) and Triple DES/AES counter mode may be used to generate either the pad or encrypted keys from which the pad may be generated or extracted. These techniques can further be based on one or more pieces of transaction data such as date and time.

The pad can be of any length. As shown in FIG. 2, the pad is the same length as the account number. Where a pad is generated that has fewer characters than the account number, the pad characters can be applied in repetition. Where the length of the pad is longer than the account number, a subset of the pad can be selected for use. For example, if a pad of four characters were applied to the account number shown in FIG. 2, the pad would be used four times in repetition. In any case, the same pad (or in some cases, its additive inverse) must be used for both the encrypting and decrypting and used in the same manner. Therefore, any pad generation must be capable of being reliably performed at both the point of encryption and decryption. As noted earlier, where the pad is used in modulus addition (or subtraction), decryption may also be possible using the additive inverse of each character of the original pad. In the example, the additive inverse is the character that, when added to the pad character, will equal the character set size. For example, if there are ten characters in a character set (0-9), the additive inverse of the character "2" will be "8".

In FIG. 2, each character of the pad is added to its respective character in the account number field (as shown in step 206). That is, the first character of the account number is added to the first character of the pad, the second character of the account number is added to the second character of the pad, and so on until the sixteenth character of the account number is added to the sixteenth character of the pad. The result of character addition is indicated as the value in the brackets. The result is that characters at positions 3, 14, and 15 have values greater than the allowable character set (again numbers zero through nine).

In order to transform the result of the character addition into a string of characters selected from the required character set, a modulus ten operation is performed on each character, step 208. The modulus operation finds the remainder of the division of one number by another. In this example, the number ten is used to correspond to the number of valid characters in the character set—in this case there are ten characters represented by numerals zero through nine. If the valid characters were letters "a" through "z" the modulus operation would use twenty-six (the number of letters in the alphabet). The result is that result of character addition is mapped into a character of the character set.

In the example shown in FIG. 2, where the pad contains the value of zero, the corresponding character of the account number is not encrypted. Thus, where certain transaction validation routines expect certain values at certain character positions, the pad can be created to accommodate those requirements. In this case, the first character might indicate the card type and the second set of four digits might indicate some other piece of important information. In addition, the resulting account number will have the appearance of a valid account number to anyone intercepting the data between the sender and the receiver and be difficult to distinguish from account numbers that are unencrypted.

The result of the character-by-character addition 206 and the modulus 10 operation 208 is an encrypted account number having characters selected from the same character set.

To decrypt the account number, the same steps are reversed. First, the decrypting entity must generate the same pad (or, in some cases, the pad's additive inverse), step 210. The pad generation will be substantially similar to the pad generation at the sender described above. Second, after the pad has been generated, the decrypting entity performs character-by-character subtraction (or if the pad is the encrypting pad's additive inverse, character-by-character addition), step 212. In the case of character-by-character subtraction, the first character of the encrypted account number is subtracted from the first character of the generated pad (i.e. 4-0), the second character of the account number is subtracted from the second character of the pad (i.e. 5-1), and so on until the sixteenth character of the account number is subtracted from the sixteenth character of the pad (i.e. 8-0). The result of each character subtraction in this example is shown in brackets at step 212. As above, characters at positions 3, 14 and 15 are characters that are outside the acceptable character set.

The modulus operation must then be applied to each resulting character of the character-by-character subtraction, step 214, to return the unencrypted account number. As described above, the value used by the modulus operation is equal to the size of the character set. In this case, the character set has ten characters (numerals zero through nine). Thus, the modulus 10 operation is applied to the result of each character-by-character subtraction.

Figure 3:
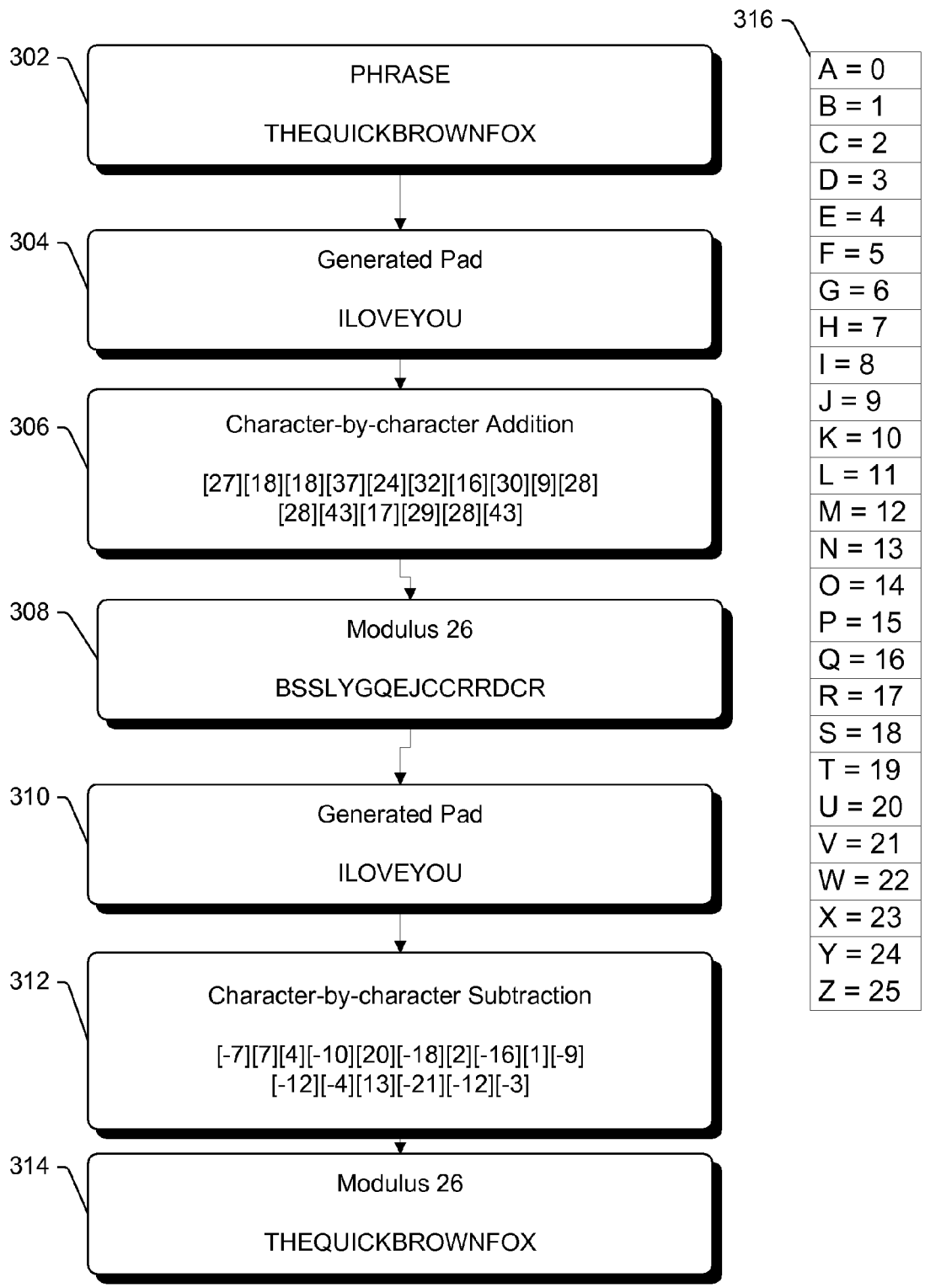
FIG. 3 depicts an exemplary set of steps for encryption of an arbitrary alphabetic phrase using character-by-character modulus addition using alphabetic characters.

FIG. 3 depicts a flow diagram for an exemplary process of encrypting and decrypting a sensitive data field with an alphabetic character set, 300. At step 302, an unencrypted original phrase is "THEQUICKBROWNFOX" consists of only alphabetic letters (i.e. letters A-Z). The entire character set is represented by table 316. Each character of the character set is mapped to a corresponding integer value as shown on the right hand side of the equals sign. The table mapping must be known by both the encrypting and decrypting entities. Table 316 is a simple table that maps numeric values in ascending order to an alphabetic letter. Thus, the original phrase is represented by the following values: 19, 7, 4, 16, 20, 8, 2, 10, 1, 17, 14, 22, 13, 5, 14 and 23, in this example.

Steps 304 and 310 show pad generation. The pad in FIG. 3 is a pass phrase comprised of characters from the same character set as the original phrase (i.e. alphabetic letters A-Z). As discussed with respect to FIG. 2, the pad can be produced by a number of different techniques provided that the encrypting and decrypting entities can generate the same pad.

In order to perform the character addition between the original phrase and the pad, each character of the pad is mapped to a value in the table, 316. As such, the pad has the following numeric values: 8, 11, 14, 21, 4, 24, 14, and 20.

The numeric value of each character of the original message is added to the numeric value of each character of the pad, step 306. In this example, the pad contains fewer character than the original phrase, and so each character of the pad will be reapplied in sequence until no characters remain of the original phrase. The result of the each character-by-character addition is shown at step 306 in brackets. Certain of the results, such as characters at positions 4, 6, and 8, are values outside the acceptable character set size. Therefore, step 308 applies the modulus operation to each of the resulting values.

Since the character set, in FIG. 3, is comprised of 26 characters, the modulo 26 operation is applied to each result of the character-by-character addition. The result creates a list of values that correspond with a number on the table, 316. Each value then is mapped back to an alphabetic character (e.g. 0 becomes "A" and 1 becomes "B") and the alphabetic character is inserted in its place into the original phrase. In accordance with the example shown in FIG. 3, the encrypted phrase is "BSSLYGQEJCCRRDCR".

The table 316 can be further used to have two way mapping of values, not shown. In this case, for example, one mapping could map original phrase to value and the second mapping could map the value to a set of characters used for the encrypted phrase. The mapping represented by the table, 316, is therefore arbitrary. Furthermore, the table 316 may be represented internally within a system where characters are already represented as a numeric value in a system, such as the case for ASCII characters. Mapping characters to the table permits arbitrary selection of character sets. In order for the table to be effective, the mapping of numeric values to characters must each be unique. Thus, 2 should not be mapped to both "A" and "B." Furthermore, the numeric values in the table must be consecutive. Notwithstanding the foregoing, the characters of a character set do not have to be unique or consecutive. Therefore "A" could be represented by both 1 and 2 and "Q" could be represented by 3.

To decrypt a message in this form, FIG. 3 starts with pad generation at step 310. The pad generation at step 310 will be the same as the pad generation at step 304. As noted with respect to FIG. 2, the pad can also be the additive inverse of the pad used during encryption. In this case, the additive inverse of the pad will be the alphabetic letter's opposite (e.g. A would be Z, B would be Y, etc.).

At step 312, the numeric mapping of each character of the pad is subtracted from the numeric mapping of each character of the encrypted phrase (or, when the additive inverse is used, each numeric value of each character of the pad is added to the numeric value of each character of the encrypted phrase). The result of the character-by-character addition is a series of numeric values in which some values are not within the range of the character set (e.g. characters at positions 1, 4, 6, and 8).

The modulus operation is the applied to each of the resulting numeric values, step 314. As above, the modulus operation is modulus 26 since the character set contains 26 characters. The result are numeric values within the range of the character set. To retrieve the original message, each numeric value that results from the modulus 26 operation on the character-by-character addition of the encrypted phrase with the character of the pad is mapped back to a character using the table, 316 (e.g. 0 would become A, 1 would become B, etc.).

Figure 4:
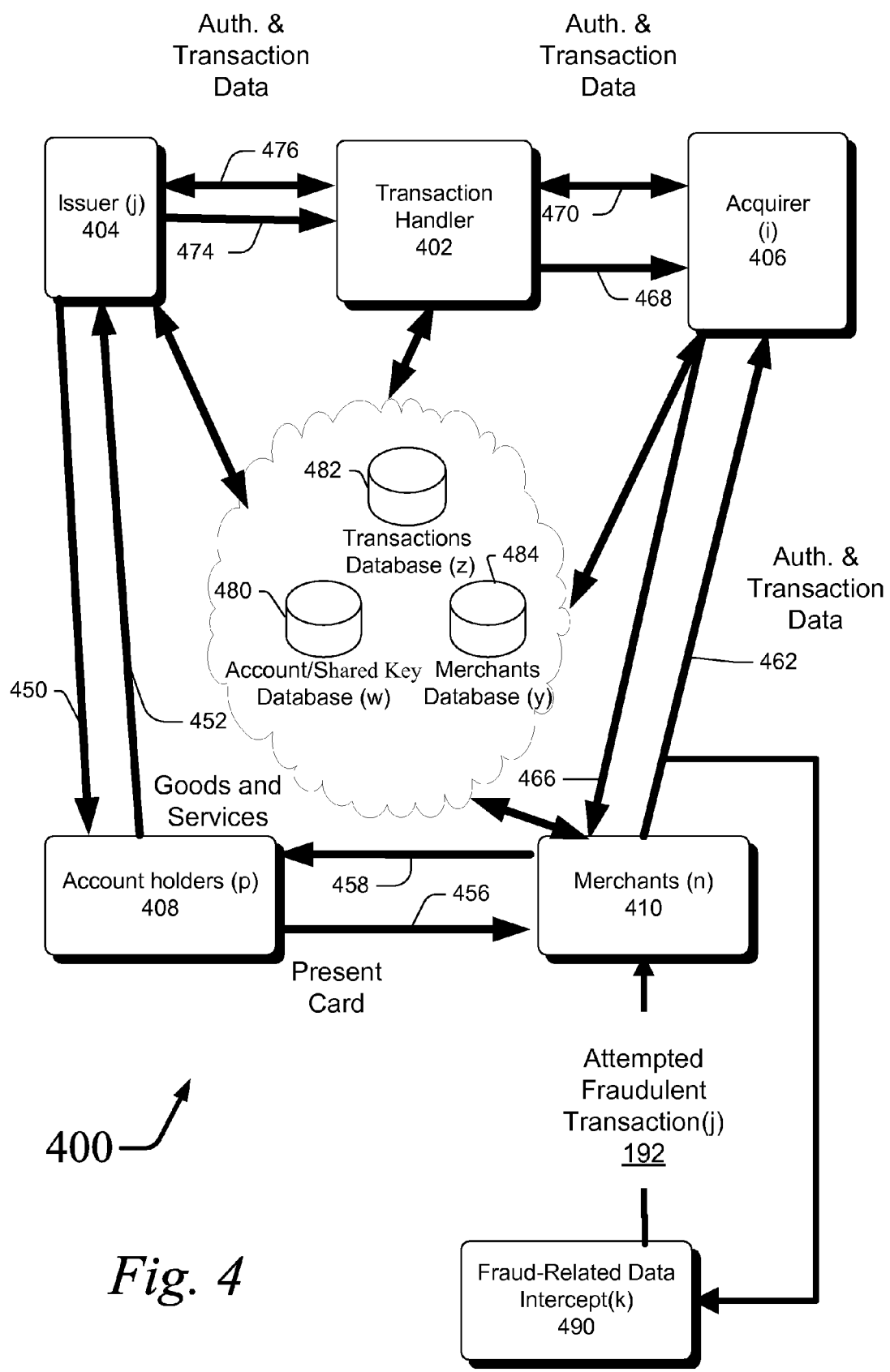
FIG. 4 depicts an exemplary process for detecting fraud-related data interception.

FIG. 4 is a diagram depicting an exemplary process 400 of a particular financial transaction system characterized substantially as in FIG. 3. The process 400 further includes a Fraud-related data intercept (FDI) (k) 490. The FDI (k) 490 is one or more entities that are in a position to intercept the transmission of transaction data along path 462. Path 462 can be any method of communication including wireless internet, Ethernet, satellite, standard network or communications protocols, internet, or radio transmissions. FIG. 4 shows the interception occurring along path 462 but it is contemplated that the interception could occur at any number of points of communication including, without limitation, between a Point of Service terminal (POS) and a network router located solely at the Merchant (n) 410 and between the Acquirer (i) 406 and TH 402. Moreover, the interception can be the result of data theft of transaction or account data stored or maintained in one or more databases, log files, or caches where, for example, the account information stored is the encrypted version of the account number.

The interception can occur by any various number of techniques including, without limitation, packet sniffing, man-in-the-middle attack, hacked and compromised hardware or software. In any event, the transmission of transaction data is thus copied and stored by the FDI (k) 490. In situations where the transmission is unencrypted or uses weak encryption, the sensitive data fields of the transaction data would be exposed. Thus, the FDI (k) 490 would be available to obtain only the encrypted sensitive data field.

Since the encrypted sensitive data is in a form that appears to be unencrypted, the FDI (k) 490 may attempt to engage in fraudulent transaction (j) 192 with one or more Merchants (n) 410 using the encrypted sensitive data obtained through the interception of the transmission along path 462. The FDI (k) 490 will present the encrypted sensitive data to the Merchant (n) 410 at the POS and the transaction data will be encrypted in accordance with the techniques as disclosed herein. Since the encrypted sensitive data will not correspond to a valid account, the transaction will be denied by the Acquirer (i) 406 or, in some cases, by the TH 402.

In one implementation, as described herein, all successful transactions and the corresponding transaction data is stored in a transaction database (z) 482. The transaction database (z) 482 includes the encrypted account number used or information sufficient to reconstruct the encrypted account number (such as the information necessary to generate a pad). In this implementation, when a transaction fails, the Acquirer (i) 406 or the TH 402, as the case may be, will use the account information data and transaction data from the failed transaction to retrieve transaction records from the transaction database (z) 482 that used the failed account information.

When one or more records are returned from the transaction database (z) 482, the Acquirer (i) 406 or the TH 402, as the case may be, can send a transmission destined for the Merchant (n) 410 indicating that this transaction is likely fraudulent. The Merchant (n) 410 then can take steps to prevent additional fraud.

In addition, the Acquirer (i) 406 or the TH 402, as the case may be, can use the one or more records returned from the transaction database (z) 482 to identify the proximal time, date, and location that the transmission was intercepted. In addition, in another implementation, where merchant information is stored in a merchant database (y) 484, the Acquirer (i) 406 or the TH 402, as the case may be, can use the one or more records returned from the transaction database (z) 482 to identify the merchant whose transaction was intercepted. Furthermore, the Acquirer (i) 406 or the TH 402, as the case may be, can retrieve records having proximal location, date and time to derive information regarding potential other data interceptions, weaknesses in security, or security breaches.

It should be understood implementations can be in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. In a payment processing system for a plurality of transactions each characterized by a merchant and an account holder engaging in the transaction upon an account that an issuer issues to the account holder, wherein a transaction handler both processes the transaction for the merchant and processes other said transactions for other merchants, each said merchant submitting the corresponding said transaction to a corresponding acquirer for processing by the transaction handler who requests the issuer of the corresponding said account to obtain payment for the corresponding said transaction from the corresponding said account and for which the issuer forwards the payment to the transaction handler who forwards the payment to the acquirer to pay the merchant for the corresponding said transaction, a method comprising:

retrieving one said account at a Point of Service terminal (POS) of one said merchant to conduct one said transaction with the account holder associated with the one said account, wherein the one said transaction includes transaction data of one or more fields at least one of which is a sensitive data field having a plurality of characters of a predetermined character set, the plurality of characters comprising an account number;

generating, by the Point of Service terminal, a generated pad, wherein the generated pad is an arbitrary set of characters that is used to encrypt and decrypt the account number;

for each said character in each sensitive data field on a character by character basis:
 forming, by the Point of Service terminal, a combined character from the character of the sensitive data field, taken alone, and a character of the generated pad;
 forming, by the Point of Service terminal, a replacement character by performing a modulus operation on the combined character; and
 storing, by the Point of Service terminal, the replacement character in the position of a corresponding character in the sensitive data field;

forming, by the Point of Service terminal, a transmission for delivery to a corresponding acquirer computer of said acquirer and containing the transaction data with the at least one said sensitive data field; and transmitting, by the Point of Service terminal, the transmission to the acquirer computer and then to a transaction handler computer of the transaction handler.

2. The method as defined in claim 1, wherein the replacement characters are characters from the character set.

3. The method as defined in claim 1, wherein each character of the generated pad is a character selected from the character set.

4. The method as defined in claim 1, further comprising using characters of the generated pad in repetition, wherein the number of characters in the generated pad is less than the number of characters in the sensitive data field.

5. The method as defined in claim 1, wherein each character in the predetermined character set is of a type selected from the group consisting of numeric, alphabetic, alphanumeric, hexadecimal, EBCDIC, ASCII, UNICODE, and ANSI.

6. The method as defined in claim 1, wherein the predetermined character set is numeric of a base selected from the group consisting of base 2, base 10, base 12, base 16, base 26, base 36, and base 64.

7. The method as defined in claim 1, wherein the account number further comprises a Cardholder Verification Value (CVV).

8. The method as defined in claim 1, wherein forming a combined character is performed using a technique selected from the group consisting of character addition, character subtraction, and character multiplication.

9. The method as defined in claim 1, wherein the generated pad is a one-time pad.

10. The method as defined in claim 1, further comprising generating the generated pad using data selected from the group consisting of: a key shared by the Point of Service terminal and the acquirer; transaction data from the one said transaction; and one or more of the time, date, and location of the one said transaction.

11. The method of claim 1 wherein the account number is 16 characters long.

12. The method of claim 1 wherein the generated pad is based on a date, location or price of the transaction.

13. The method of claim 1 wherein the generated pad is a concatenated value including the time and date of the transaction.

14. The method of claim 1 wherein generating the pad comprises using a key to generate the generated pad.

15. The method of claim 1 wherein the account number comprises 16 characters.

16. The method of claim 10 wherein generating the generated pad is generated from transaction data comprising a location of the POS terminal.

17. The method of claim 10 wherein generating the generated pad is generated from transaction data comprising a number of items purchased, a time and date, and a location of the transaction.

18. The method of claim 1 wherein the generated pad is longer than the account number.

19. The method of claim 1 wherein forming the combined character is performed by addition.

20. The method of claim 1 wherein the generated pad is derived from information about the transaction.

21. The method of claim 1 wherein retrieving one said account at the POS terminal comprises receiving the one said account from a payment cart.

* * * * *

UNITED STATES PATENT AND TRADEMARK OFFICE
CERTIFICATE OF CORRECTION

| | | |
|---|---|---|
| PATENT NO. | : 9,070,129 B2 | |
| APPLICATION NO. | : 12/202978 | |
| DATED | : June 30, 2015 | |
| INVENTOR(S) | : Sheets et al. | |

It is certified that error appears in the above-identified patent and that said Letters Patent is hereby corrected as shown below:

In the claims

Claim 16 Column 12, lines 12-14 replace "The method of claim 10 wherein generating the generated pad is generated from transaction data comprising a location of the POS terminal." with --The method of claim 10 wherein the generated pad is generated from the transaction data and the location of the one said transaction.--

Claim 17 Column 12, lines 15-18 replace "The method of claim 10 wherein generating the generated pad is generated from transaction data comprising a number of items purchased, a time and date, and a location of the transaction." with --The method of claim 10 wherein the generated pad is generated from the transaction data comprising a number of items purchased and the time, the date, and the location of the one said transaction.--

Signed and Sealed this
Twenty-ninth Day of December, 2015

Michelle K. Lee
*Director of the United States Patent and Trademark Office*